United States Patent
Marth et al.

[11] Patent Number: 6,037,693
[45] Date of Patent: Mar. 14, 2000

[54] COMMUTATOR MOTOR

[75] Inventors: Detlef Marth, Gerlingen; Johann Rothkopf, Finsing; Luciano Zorzin, Ebersberg; Wolfgang Pfaff, Remseck-Aldingen; Dirk Arnold, Munich, all of Germany

[73] Assignee: Robert Bosch GmbH, Stuttgart, Germany

[21] Appl. No.: 09/233,831

[22] Filed: Jan. 20, 1999

[30] Foreign Application Priority Data

Feb. 4, 1998 [DE] Germany ............... 198 04 369

[51] Int. Cl.[7] .................................................. H01R 39/46
[52] U.S. Cl. ..................... 310/220; 310/220; 310/51; 310/71; 310/68 R; 310/221; 310/223; 310/68 C; 310/89; 310/224
[58] Field of Search ................... 310/220, 51, 71, 310/72, 68 R, 221, 223, 68 C, 89, 224

[56] References Cited

U.S. PATENT DOCUMENTS 2,015,667  10/1935  Fleming et al. .
4,323,804   4/1982  Zelt .
4,342,934   8/1982  Wijhe et al. ............... 310/239
5,196,750   3/1993  Strobl ....................... 310/239
5,306,974   4/1994  Bates ........................ 310/68 R

FOREIGN PATENT DOCUMENTS 0 645 872 A1  3/1995  European Pat. Off. .
2 730 204     8/1996  France .
27 02 404     7/1978  Germany .

OTHER PUBLICATIONS

Patent Abstract of Japan, 56139056, Oct. 30, 1981, Applicant: matsishita Electric Works Ltd, Inv.: Kamimoto Nobuaki.

Primary Examiner—Thomas M. Dougherty
Assistant Examiner—Thanh Lam
Attorney, Agent, or Firm—Michael J. Striker

[57] ABSTRACT

A commutator motor has at least two supply terminals; a metallic pole tube, and an interference suppressing device, the pole tube being formed as a part of the interference suppressing device.

9 Claims, 3 Drawing Sheets

COMMUTATOR MOTOR

BACKGROUND OF THE INVENTION

The present invention relates to commutator motors.

Commutator motors produce frequently high frequency interferences due to the commutation process on a commutator/brush system, which can interfere with the broadcast reception. In order to dampen these interferences, interference suppressing features are known, such as for example the connection with interference-suppressing elements or a suitable structural design of the commutator motor. Commutator motors of a small size cause special problems, since frequently they are produced partially of synthetic plastic and have supply terminals (+/−voltage supply), which are insulated from the metallic pole tube.

It is known the reduce the interferences which occur on the terminals by arranging the interference suppression elements such as for example a longitudinal inductivities in the supply conductors and/or capacitors between the terminals. However, the efficiency of these interference suppressing elements is reduced due to the properties of the components and the limited available structural space.

The German document DE 27 02 404 discloses a commutator motor with an interference suppression device. The interference suppression device includes interference suppression elements which are arranged in the immediate vicinity to a brush supporting plate and connected with a terminal conductors to the carbon brushes (plus and minus sides).

SUMMARY OF THE INVENTION

Accordingly, it is an object of the present invention to provide a commutator motor which avoids disadvantages of the prior art.

In keeping with these objects and with others which will become apparent hereinafter, one feature of present invention resides, briefly stated, in a commutator motor with two or more supply terminals for voltage supply of the commutator motor, a metallic pole tube and an interference suppressing device, wherein in accordance with the present invention the pole tube forms a part of the interference suppressing device.

When the commutator motor is designed in accordance with the present invention, it has an interference suppressing device with which the interference suppression is further improved.

Due to the incorporation of the pole tube into the interference suppressing concepts, the interference suppression is improved. In accordance with a preferable embodiment, a conductive connection is provided via a supply with a wire supply conductor with the minus terminal and/or a capacitive connection of the plus and/or minus terminal to the pole tube.

The line inductivites which are damaging for the interference suppressive action, such as the inductivity of the conductive connection or the conductor inductivities of the capacitors, can be further limited in accordance with a preferable embodiment of the invention, when in particular for high frequencies they reach a region of more than 50 MHz.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
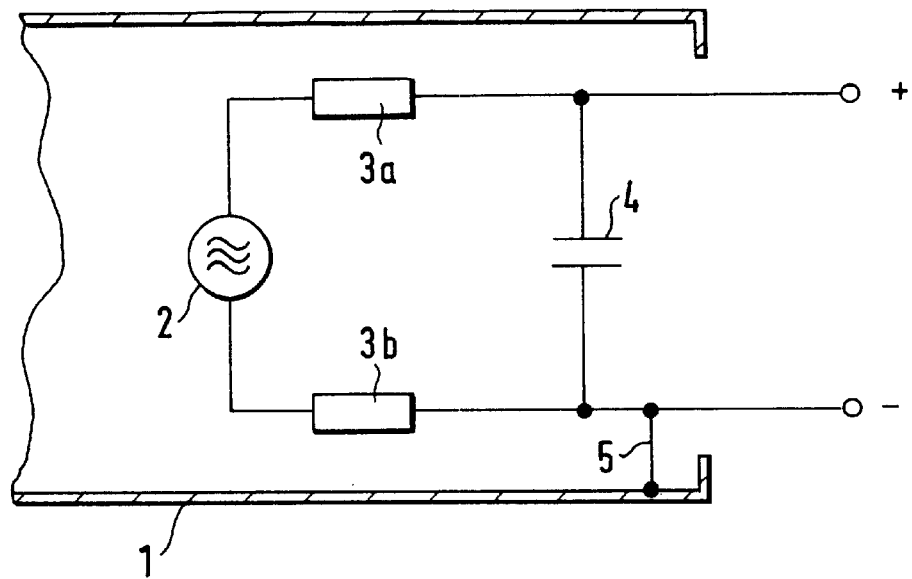
FIG. 1 is a schematic view of an interference suppressing device in accordance with the first embodiment of the invention.

FIG. 1 shows a supply terminals +/− for the plus/minus voltage supply of a commutator motor with a metallic pole tube 1. The interference source is particularly identified with reference numeral 2. In the supply conductors for the plus supply and the minus supply, disturbance suppressing inductivities 3a and 3b are provided. The supply terminals are connected through a capacitor 4 which acts as a known interference suppressing element.

In accordance with a first embodiment of the present invention, the interference suppressing action can be substantially improved by an additional interference suppressing element 5. This additional interference suppressing element 5 is formed as an electrically conductive connection by a selected supply terminal, for example the minus terminal, and the pole tube 1. In this manner, the pole tube 1 is incorporated in the interference suppressing concept and forms a part of the interference suppressing device.

Figure 2:
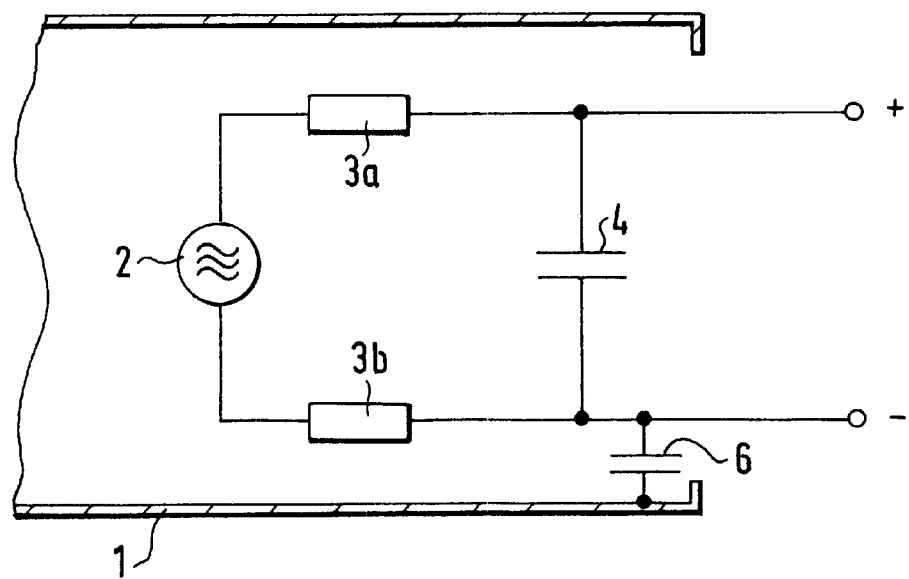
FIG. 2 is a view showing a second embodiment of an interference suppressing device in accordance with the present invention.

FIG. 2 shows a second embodiment of the present invention. Instead of an electrically conductive connection between a selected supply between a selected supply terminal and the pole tube 1 and improves the interference suppression because of its large surface.

Figure 5:
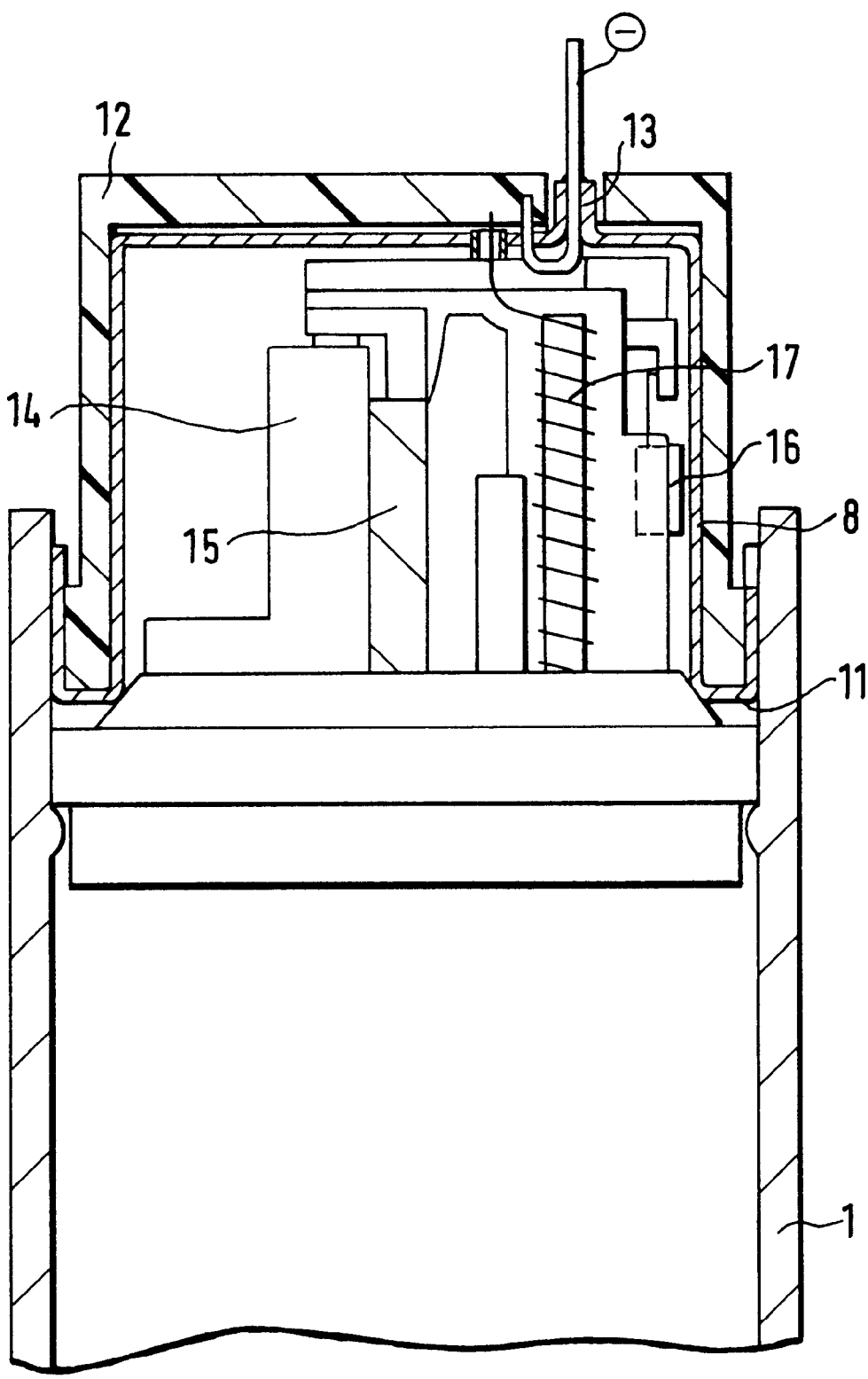
FIG. 5 is a view showing a cross-section through the fourth embodiment of the present invention.

FIG. 5 shows a cross-section of an interference suppressing device in accordance with the fourth embodiment of the present invention. An interference suppressing device is inserted in the pole tube 1 and form as a connection cover 12 composed of an electrically insulating material and closing the end of the pole tube 1. The screening pot 8 is received as an insert in the interior of the connecting cover and formed as a deep-drawn part with passages 9a, 9b, 10. The selected supply terminal, for example minus terminal, is connected through a welding or soldering connection 13 through the passage 10 with the screening pot 8. The screening pot 8 contacts the pole tube 1 through the connecting collar 11. A brush holder 14, a brush chamber 15 and the brushes with the connecting lances are arranged in the interior of the screening pot 8 in a known manner.

An interference suppression capacitor 6 is connected between the other supply terminals as a further interference suppressing element. The interference suppressing action is further improved with inductivites between the brushes and in the other supply terminals in form of the interference disturbing chokes. terminal and the pole tube 1, a capacitor 6 is provided. It connects the selected supply terminal capacitatively with the pole tube 1.

Figure 3:
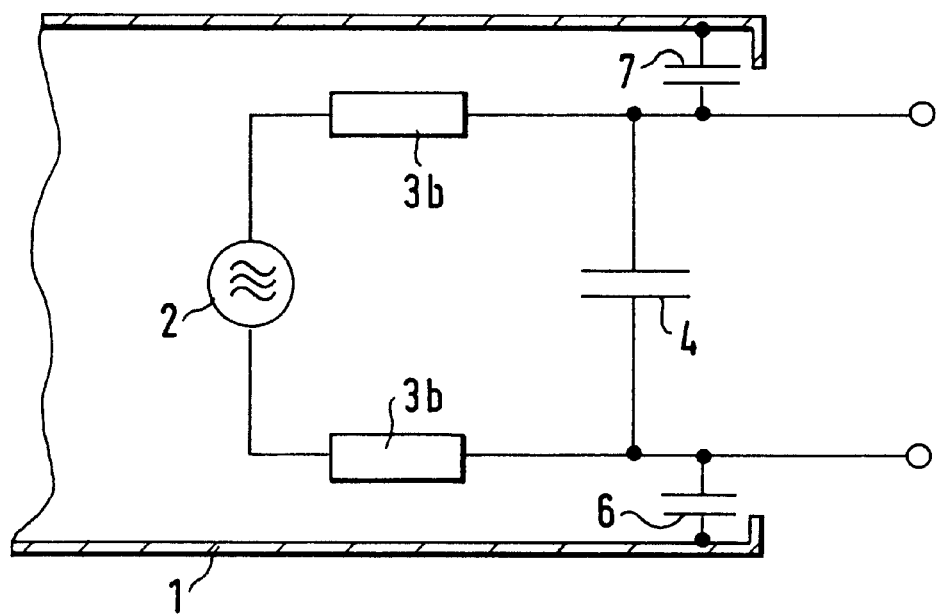
FIG. 3 is a view showing a third embodiment of an interference suppressing device in accordance with the present invention.

FIG. 3 shows a third embodiment of the present invention. It is different from the second embodiment by an additional capacitor 7. The additional capacitor 7 is connected between the other supply terminal and the pole tube 1. Therefore both supply terminals are capacitatively connected with the pole tube 1.

Figure 4:
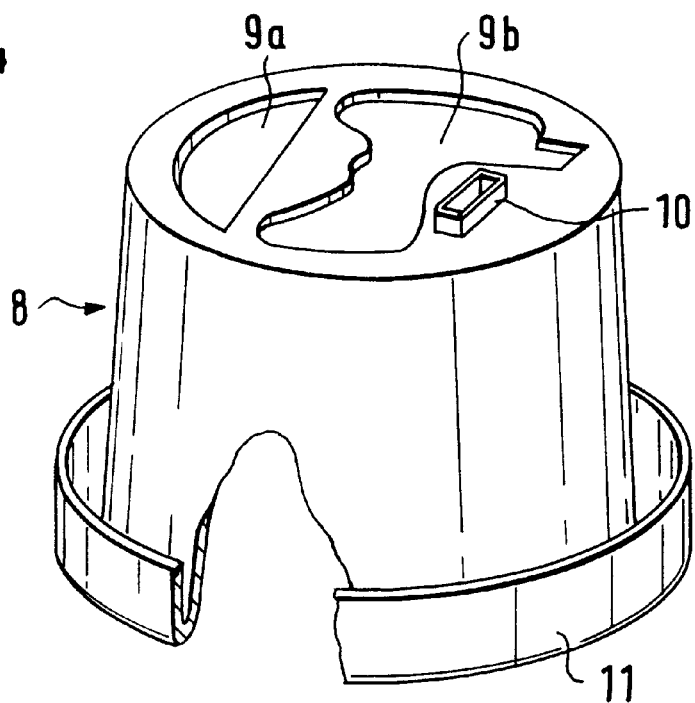
FIG. 4 is a view showing a fourth embodiment of an interference suppressing device in accordance with the present invention.

The fourth embodiment of the present invention is shown in FIGS. 1 and 4. Here the connection between a selected supply terminal, for example the minus terminal and the pole tube 1 is performed through a high-conductive, metal screen pot 8. The screen pot 8 is provided with throughgoing passages 9a, 9b for cooling medium or the like, and for the other throughgoing supply terminal, for example the plus terminal. The additional not shown part provides insulation of the throughgoing passage for the supply terminal relative to the other throughgoing supply terminal.

The voltage supply terminal which is connected through the screening pot 8 with the pole tube, is connected with the screening pot 8 low-omig through 10. A connecting collar 11 provides the contact with the pole tube 1. The screening port 8 provides a large-surface connection The screening pot 8 forms together with the pole tube 1 an electromagnetically screened chamber. In accordance with a preferamble embodiment, the connection with a selected supply terminal, for example the minus terminal, is performed directly on the wall of the screening pot, and the other supply terminal, for example the pot terminal is connected through a filter circuit in low-impedance manner also with the wall, for example through a capacitor. In this way, the damping of the high frequency-interferences is drastically improved.

The screening pot 8 is formed for example as an insert for insertion in a connecting cover 12. Thereby, this pot on the one hand is directly connected with a selected supply terminal, for example the minus terminal, by a welding or soldering connection and the like, and on the other hand can be connected over a large surface of the pole tube 1 during the assembly of the commutator motor. For example in a commutator motor which drives an electric fuel pump, a connecting collar 11 can be provided on the edge of the screening pot 8, for connecting the pole tube 1 with a brush holder 14 and a connecting cover 12 in a flanging process.

In accordance with another not shown embodiment, the improved screening and interference suppressing action is obtained when the screening pot 8 is formed as a metallic grate which is integrated in a connecting cover 12 of a synthetic plastic material so that a low-impedance connection to the selected supply terminal, for example the minus terminal, and the pole tube 1 is performed over its whole periphery.

In accordance with still a further not shown embodiment, the special screening pot 8 can be integrated in the connecting cover 12 so that the connecting cover 12 is composed of a conductive synthetic plastic and takes over the screening action of the screening pot 8, while the other supply terminal, for example the plus terminal, must be insulated relative to the connecting cover.

In accordance with still a further embodiment of the present invention, the screening pot 8 can be arranged outside of the connecting cover and connected to the pole tube in a low-impedance manner.

The present invention can be also utilized in electric motors which are operated in two rotary directions. The connection of the screening pot 8 is performed in this case through a capacitor to one supply terminal, as shown in FIG. 2 or both supply terminals, as shown in FIG. 3.

When compared with known interfering suppression devices for electric motors, the present invention provides a substantial improvement of the interference suppression. The interference suppression is improved particularly in an advantageous manner with the following elements:

screening action with screening pots;

low omig and low-impedance contacting of the screening pot with the pole tube, whereby a close screening chamber is provided, in which the interference sources and the interference suppressing elements are located;

connected the selected supply terminal, for example the minus terminal, galvanically and the other supply terminal, for example the plus terminal, capacitively, or connection of both supply terminals capacitively through the screening pot to the pole tube;

significant improvement of the interference suppression, in particular in important regions between 50 MHz and 150 MHz by more than 20 dB relative to known solutions.

It will be understood that each of the elements described above, or two or more together, may also find a useful application in other types of constructions differing from the types described above.

While the invention has been illustrated and described as embodied in commutator motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A commutator motor, comprising at least two supply terminals; a metallic pole tube; an interference suppressing device, said pole tube being formed as a part of said interference suppressing device; a connecting collar; and a screening pot which connects at least one of said supply terminals with said pole tube in an electrically conductive manner over a large surface through said connecting collar.

2. A commutator motor as defined in claim 1, wherein at least one of said supply terminals is capacitatively connected with said pole tube.

3. A commutator motor as defined in claim 1, wherein both said supply terminals are capacitatively connected with one another.

4. A commutator motor as defined in claim 1, wherein one of said supply terminals is electrically conductively connected with said pole tube.

5. A commutator motor as defined in claim 1, wherein said screening pot is formed as a deep-drawn insert which is inserted in an electrically insulating connecting cover and has a connecting collar which electrically connects said pole tube with said screening pot.

6. A commutator motor as defined in claim 1, wherein said screening pot is formed as a metallic grate and integrated in an interior of an electrically insulating connecting cover.

7. A commutator motor as defined in claim 1; and further comprising a connecting cover composed of an electrically conductive synthetic plastic material, said connecting cover connecting at least one of said supply terminals with said pole tube.

8. A commutator motor as defined in claim 1, wherein said screening pot is arranged outside a connecting cover and connected with said pole tube in a low-impedance manner.

9. A commutator motor as defined in claim 1, wherein at least one of said supply terminals is provided with an inductivity.

* * * * *